(12) United States Patent
Franz et al.

(10) Patent No.: US 7,527,816 B2
(45) Date of Patent: May 5, 2009

(54) FEED SUPPLEMENT AND METHOD

(75) Inventors: Peter H. Franz, Edina, MN (US);
Martin J. Nelson, Scottsdale, AZ (US);
Michael L. Nelson, Waconia, MN (US)

(73) Assignee: Techmix, Inc., Minneapolis, MN (US)

( * ) Notice: Subject to any disclaimer, the term of this patent is extended or adjusted under 35 U.S.C. 154(b) by 792 days.

(21) Appl. No.: 10/913,583

(22) Filed: Aug. 6, 2004

(65) Prior Publication Data
US 2006/0027174 A1    Feb. 9, 2006

(51) Int. Cl.
*B29B 9/08* (2006.01)

(52) U.S. Cl. ............ 426/285; 426/511; 426/545; 426/807; 426/448; 426/450; 426/453; 426/623; 425/331

(58) Field of Classification Search ......... 426/516, 426/523, 801, 285, 807, 511, 447–450, 453–454, 426/623; 425/331
See application file for complete search history.

(56) References Cited

U.S. PATENT DOCUMENTS

| | | | | |
|---|---|---|---|---|
| 2,491,588 A | * | 12/1949 | Shively, Sr. | 425/461 |
| 3,008,434 A | * | 11/1961 | Maldari | 425/461 |
| 3,016,026 A | * | 1/1962 | Sorensen | 425/314 |
| 3,019,481 A | * | 2/1962 | Negoro | 425/532 |
| 3,117,343 A | * | 1/1964 | Soars, Jr. | 425/331 |
| 3,325,295 A | * | 6/1967 | Ven | 426/285 |
| 3,605,649 A | * | 9/1971 | Bundus | 425/97 |
| 3,807,926 A | * | 4/1974 | Morse | 425/331 |
| 3,898,328 A | | 8/1975 | Beigler et al. | |
| 4,160,041 A | | 7/1979 | Schroeder et al. | |
| 4,380,424 A | * | 4/1983 | Skoch et al. | 425/331 |
| 4,384,842 A | * | 5/1983 | Cavalli | 425/463 |
| 4,413,016 A | * | 11/1983 | Skoch et al. | 426/454 |
| 4,652,454 A | | 3/1987 | Remesy et al. | |
| 4,689,319 A | | 8/1987 | Phillips et al. | |
| 4,839,171 A | | 6/1989 | Nelson | |
| 4,839,347 A | | 6/1989 | Franz | |
| 4,976,977 A | | 12/1990 | Johnson et al. | |
| 4,983,343 A | * | 1/1991 | Lund | 264/142 |
| 4,988,520 A | | 1/1991 | Overton | |
| 5,008,248 A | | 4/1991 | Bywater et al. | |
| 5,028,437 A | | 7/1991 | Jerrett | |
| 5,038,396 A | | 8/1991 | Gjerlov | |
| 5,149,555 A | * | 9/1992 | Flindall | 426/448 |
| 5,211,980 A | | 5/1993 | Cox | |
| 5,505,968 A | | 4/1996 | Schaefer et al. | |
| 5,714,184 A | * | 2/1998 | Major | 426/74 |

(Continued)

OTHER PUBLICATIONS

Thompson et al, JAVMA, "*Effects of Environmental Management on Seasonal Decrease in Milk Production in Dairy Cattle*", vol. 214, No. 1, Jan. 1, 1999, pp. 85-88.

(Continued)

*Primary Examiner*—Drew E. Becker
*Assistant Examiner*—Steven Leff
(74) *Attorney, Agent, or Firm*—Nikolai & Mersereau, P.A.; C. G. Mersereau

(57) ABSTRACT

A re-hydration supplement composition particularly suitable to counteract dehydration stresses in mature bovine mammals in the form of a pelletized feed supplement is disclosed which includes relatively large fractions of carbohydrates including saccharides, cationic and anionic electrolytes and a minor amount of betaine osmolyte. A process for pelleting is also disclosed.

30 Claims, 5 Drawing Sheets

U.S. PATENT DOCUMENTS

| | | | |
|---|---|---|---|
| 5,728,675 A | | 3/1998 | Schaefer et al. |
| 5,876,763 A | | 3/1999 | Montner et al. |
| 5,908,634 A | | 6/1999 | Kemp et al. |
| 5,962,733 A | | 10/1999 | Lall et al. |
| 6,024,993 A | * | 2/2000 | Theuninck et al. ............ 426/74 |
| 6,053,722 A | * | 4/2000 | Topolski et al. ............. 425/313 |
| 6,210,741 B1 | * | 4/2001 | van Lengerich et al. ..... 426/615 |
| 6,248,374 B1 | * | 6/2001 | Murray et al. ................ 426/72 |
| 6,365,152 B1 | | 4/2002 | McKinney |
| 6,579,904 B1 | | 6/2003 | Hopps et al. |
| 2002/0176881 A1 | | 11/2002 | Verlaan et al. |

OTHER PUBLICATIONS

J.W. West, Journal of Dairy Science, "*Effects of Heat-Stress on Production in Dairy Cattle*", vol. 86, 2003, pp. 2131-2144.

Ray et al, Journal of Dairy Science, "*Season and Lactation Number Effects on Milk Production and Reproduction of Dairy Cattle in Arizona*", vol. 75, 1992, pp. 2976-2983.

Ominski et al, Journal of Dairy Science, "*Physiological and Production Responses to Feeding Schedule in Lactating Dairy Cows Exposed to Short-term, Moderate Heat Stress*", vol. 85, 2000, pp. 730-737.

\* cited by examiner

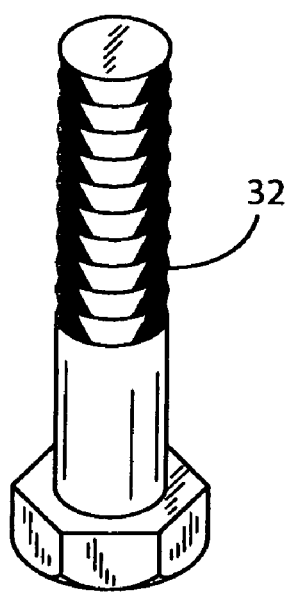
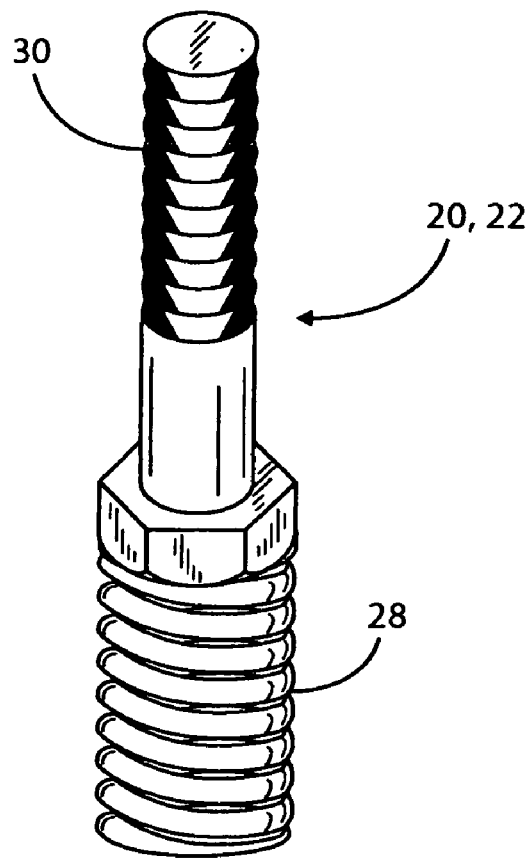
FIG. 3a
(PRIOR ART)
FIG. 3b

FEED SUPPLEMENT AND METHOD

BACKGROUND OF THE INVENTION

I. Field of the Invention

The present invention relates to the treatment of dehydration in large adult domestic animals, particularly mature bovine mammals, caused by environmental stresses to thereby maintain normal nutrient and body fluid balances. More specifically, the present invention relates to a pelletized feed supplement composition and method of making designed for use in feed intended for beef and dairy cattle, for example, to help prevent dehydration during extreme environmental conditions such as extreme heat and high humidity that causes dairy cows and beef cattle to minimize their production of milk or maintain normal body weight; or, prior to shipment, to help prevent dehydration and loss of body fluids when animals do not receive or have feed and water available for their normal consumption during transport.

II. Related Art

Re-hydration products such as that disclosed in U.S. Pat. No. 4,839,347 to Peter H. Franz, an inventor in the present application, have been very effective in reducing losses from dehydration in animals when administered via the drinking water. Animals normally consume drinking water at a rate of about 8-12% of their body weight per day, depending on climatic conditions; and when measured over extended period of time, most animals consume an average volume of about 10% of their body weight in fluids.

Present accepted drinking water facilities on most livestock farms, for example, operate on a continuous flow basis in which they may store a small amount (3-4) gallons of water. Once these amounts of drinking water are consumed, the free flow or continuous systems automatically refill dispensing containers on a continuous basis to make drinking water available to animals on demand. Animals such as young piglets weighing 10-20 pounds consume 1-2 pounds, or pints, of water on a daily basis over perhaps 6-10 intakes throughout a day or 24-hour period. The continuous flow drinking water delivery systems have developed proportioners that can administer water soluble re-hydration products such as disclosed in the above patent for poultry, swine and calves until they reach a certain size. However, once cattle reach a weight of over 600 pounds, oral re-hydration products such as the formula of the above-mentioned patent are much less effective in preventing dehydration because of difficulties in proportioning for the large total amounts of water consumed on a daily basis by each animal.

Thus, a dairy or beef animal weighing 1,000 pounds will normally consume about 100 pounds or 12.5 gallons of water per day. These animals consume up to 5 gallons at a single time and most continuous drinking water systems cause the flow to move so quickly that they have difficulty in maintaining the correct concentration of re-hydration products in the water within a normal system pipeline, thereby reducing the potential benefits of such re-hydration products for large animals. In addition, dairy cows and lactating beef cows producing milk need additional supplies of drinking water for milk production. A 1,200 pound cow producing 80 pounds of milk, for example, would need 80 pounds of water for milk production plus 120 pounds of water for normal maintenance or a total of 200 pounds (25 gallons) of water on a daily basis. Many cows produce in excess of even 100 pounds of milk per day so that it can be seen that the required fluid consumption is quite high in these animals. For the above and other reasons, there exists a definite need to supply re-hydration products to such animals on a basis other than via the drinking water.

Those raising beef and dairy animals have long realized that milk production drops in hot weather and during transport and are in need of an alternative way of re-hydrating those animals to prevent body shrink and dehydration. The re-hydration material of the present invention has been specifically designed to answer this need by providing such a re-hydration material in a pellet form which, when mixed with the feed or fed as a top dress, provides similar re-hydration benefits as seen by the drinking water supplement for small (10-400 pound) animals.

Additionally, in the related art, U.S. Pat. Nos. 5,505,968 and 5,728,675 disclose supplements for treating stress associated with transport, holding, management and handling of animals. These supplements may be administered to an animal in solid form. U.S. Patent Application Publication No. 2002/0176881 discloses a supplement for treating dehydration which, although preferably in the form of a fluid, may be in the form of a premix, a powder, a glomerate, a syrup, a gel, a tablet or a capsule. That supplement includes an amount of betaine, one or more digestable carbohydrates and one or more minerals.

SUMMARY OF THE INVENTION

By means of the present invention there is provided a re-hydration composition for the treatment of dehydration in large mammals, such as mature bovine animals, preferably administered to the animals in solid form with the feed and, most preferably, it is produced in the form of stable pellets which are added to the feed. The formula includes high energy nutrients in the form of saccharides including both monosaccharides (dextrose and fructose) and disaccharides (sucrose and lactose) and electrolytes to help restore proper osmolarity in the animals. The electrolytes include both cationic and anionic electrolytes. The cations preferably include sodium, potassium, calcium and magnesium. The anions preferably include chloride, carbonate, phosphate and sulfate. A large fraction of the composition is made up of grain and grain by-products including wheat middlings and cooked cereal fines. Additional ingredients are utilized to enhance taste and also to promote stability and processing of the material into pellets. A complete listing of the ingredients for formulae in accordance with the present invention is shown in Table I.

Another important aspect of the invention aside from the novel composition of the re-hydration supplement has to do with the pelleting process itself. The pellets are generally produced using a die containing an array of hollow, generally cylindrical die chambers, each chamber being a hollow passage having an inlet and an outlet. The die including the chambers is connected to a source of heat and steam which can be applied to the chambers during the pellet-forming process. Pellet stock in the form of pre-mixed dry powder including a feed supplement formula is forced through the die chambers and forms congealed cylindrical pellets in the presence of applied heat and steam. This causes the material to swell significantly. An important aspect of the process of the present invention addresses and solves the problem of expansion and increased friction by enabling developing pellets to expand as they progress in the chambers during the formation process. This is accomplished by increasing the diameter of the chambers between the inlet openings which admit the material to be pelleted and the outlet openings from with the formed pellets are discharged. While this can be a gradual increase in diameter, the preferred configuration includes a rather abrupt increase in the diameter of the chamber about halfway between the inlet and the outlet which, in effect, creates a dual diameter chamber to aid in the pellet formation process. This alleviates long-standing problems associated with excess heat from expansion friction.

Certain additives are also included in the mix such as lubricants which aid in moving the material through the die and coating materials, which also can be added during the pelleting process, both to preserve the integrity of the materials within the pellet and also to prevent the pellets from sticking to each other and prevent the formation of cubes or clumps in the product.

The concept of the present invention also includes the concept of a method of treating animals utilizing the re-hydration composition.

BRIEF DESCRIPTION OF THE DRAWING

In the drawings, wherein like numerals designate like parts throughout the same:

FIG. 3a depicts a prior art rigid pellet mill roller retainer;

FIG. 3b depicts a resilient pellet mill roller spring constructed in accordance with the invention;

FIG. 4b depicts a variety of patterns that can be applied to the roller of FIG. 4a.

DETAILED DESCRIPTION

Figure 1:
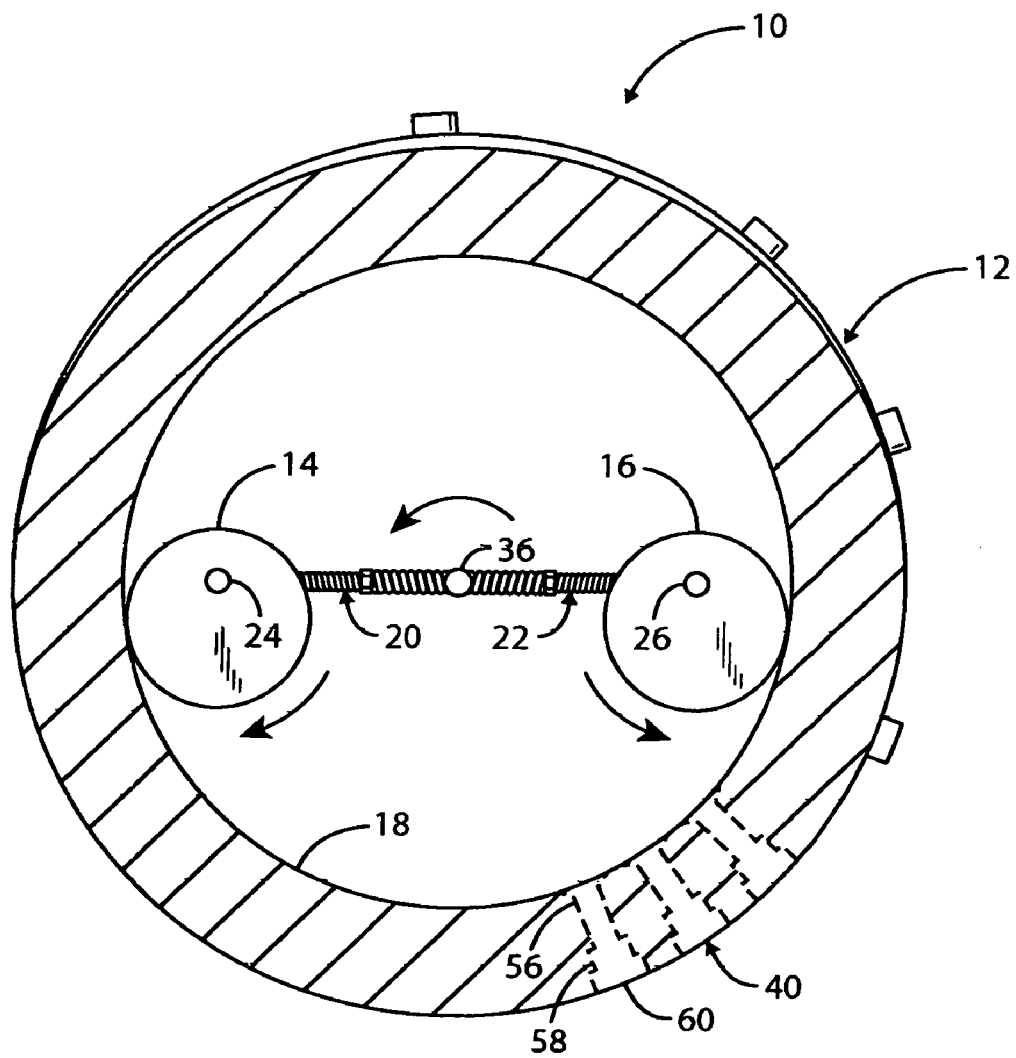
FIG. 1 is a schematic representation of a pellet mill in accordance with the invention.

The detailed description includes a limited number of formulae and several examples describing field trials utilizing the example composition of Table I to re-hydrate or maintain hydration in bovine animals in a plurality of situations. This material is presented by way of explanation and is not intended to be limiting with respect to the inventive concept in any manner. For example, it will be appreciated that within the scope of the ranges of Table I, a very large number of successful formulae could be drawn.

The ingredients in the composition of the re-hydration feed supplement of the invention are illustrated in Table I, below. That table represents a range of ingredients that could successfully be made into pellets.

One important aspect of the formula involves the system of electrolytes and electrolyte concentration which are broken down in the following tables.

Sodium Chloride & Bicarbonate Sources

|  | Low | High | Example |
|---|---|---|---|
| Sodium Chloride | 1.25% | 3.75% | 3.15% |
| Sodium Bicarbonate | 0.05% | 2.50% | 0.312% |
| Totals | 1.30% | 6.25% | 3.46% |

Potassium Chloride, Carbonate and Phosphate Sources

|  | Low | High | Example |
|---|---|---|---|
| Potassium Chloride | 1.25% | 7.50% | 3.75% |
| Potassium Carbonate | 0.50% | 5.00% | 2.50% |
| Di Potassium Phosphate | 0.025% | 0.25% | 0.062% |
| Totals | 1.775% | 12.75% | 6.30% |

Calcium Carbonate and Lactate Sources

|  | Low | High | Example |
|---|---|---|---|
| Calcium Carbonate | 0.25% | 5.00% | 1.00% |
| Calcium Lactate | 0.05% | 0.50% | 0.16% |
| Totals | 0.30% | 5.50% | 1.16% |

Phosphate Sources

|  | Low | High | Example |
|---|---|---|---|
| Monosodium Phosphate |  |  |  |
| Totals | 0.05% | 0.50% | 0.25% |

Magnesium Sources

|  | Low | High | Example |
|---|---|---|---|
| Magnesium Oxide | 0.005% | 0.50% | 0.009% |
| Magnesium Sulfate | 0.01% | 0.75% | 0.345% |
| Magnesium Gluconate | -0- | 0.25% | 0.01% |
| Totals | 0.105% | 1.50% | 0.364% |

It will be appreciated that salt (sodium chloride) in high concentration is unpalatable and even at low levels can be used as a tool to limit feed intake when fed as a part of a free choice offering. Levels of 5% salt in a total ration can restrict intake of feed. Sodium Chloride and Sodium Bicarbonate tend to act independently in regard to feed intake restriction. Therefore, when a 3.75% level of salt is used in the re-hydration supplement of the invention it does not restrict or limit feed intake. Even when the two combined sources of Sodium Chloride and Sodium Bicarbonate (3.75% and 2.5%=6.25%) are used in the re-hydration supplement of the invention with most rations containing less than 1% salt, there would be no restriction in feed intake as the total levels of salt in the entire ration would be well below the 5% level that restricts feed intake. The flavoring agents in the re-hydration supplement of the invention and feed intake enhancing ingredients such as sugars, carmel-milk flavors and yeast have shown the re-hydration supplement of the present invention under field conditions to be readily consumed when mixed in feed or used as a top dress.

The total electrolyte concentrations in the re-hydration supplement of the invention at the low, high and example concentrations are generally as follows:

| | |
|---|---|
| Low Level | 3.53% |
| High Level | 26.5% |
| Example formula | 11.54% |

Thus, the pellets of the invention may provide a broad range of electrolyte concentrations, i.e., from about 3.5% to about 27%. A preferred range might have total electrolyte level of from about 8% to about 15%. The electrolytes also include a broad spectrum of ions which preferably includes the eight electrolytes essential for re-hydration, namely:

| | | | |
|---|---|---|---|
| Sodium | Chloride | Magnesium | Calcium |
| Potassium | Phosphate | Bicarbonate | Sulfate |

In addition to providing the eight essential electrolytes as compared to many electrolyte formulae that provide only 2-5 electrolytes, the present pellets derive three electrolytes from different sources such as potassium chloride, potassium carbonate and Dipotassium Phosphate as compared to many formulas which only provide a source of potassium from Potassium Chloride. This wider spectrum of electrolyte sources helps enhance utilization as each source is absorbed or utilized individually at different rates to provide a wider spectrum of absorption.

Betaine

Betaine is important to the formula of the present invention for several reasons. First, betaine is an osmolyte and osmolytes have a role in maintaining normal electrolyte and fluid levels or concentration within the animal's cells. In addition, osmolytes are present in high levels in the kidneys of the animals. As such, these osmolytes monitor and help control fluid and electrolye excretion from the kidneys.

TABLE I

| | Percent | | | |
|---|---|---|---|---|
| | Example Formula | Low | High | Alternative Sources |
| Wheat Middlings | 50.4 | 25 | 75 | Other Grain By-products, Soy Hulls |
| Dehydrated Alfalfa Meal | 5 | 1.25 | 25 | Other Roughage Products |
| Cooked Cereal Fines | 10 | 1.25 | 25 | Bakery By-products |
| Citric Acid | 3.125 | 0.5 | 5 | Fumaric, Lactic, Phosphoric Acid |
| Dextrose | 8.78125 | 1 | 15 | |
| Sucrose | 2.5 | 1 | 15 | |
| Lactose | 2.5 | 1 | 15 | |
| Fructose | 0.0625 | 0.05 | 15 | |
| Sodium Chloride | 3.25 | 1.25 | 3.75 | |
| Potassium Chloride | 3.25 | 1.25 | 7.5 | |
| Potassium Carbonate | 2.5 | 0.5 | 5 | |
| Tricalcium Phosphate (Milk Calcium) | 3 | 0.1 | 12 | |
| Calcium Carbonate | 1 | 0.25 | 5 | |
| Molasses | 0.75 | 0.5 | 5 | |
| Animal Fat | 1 | 0.5 | 2.5 | Vegetable Oil |
| Sodium Bicarbonate | 0.3125 | 0.05 | 2.5 | |
| Betaine | 0.1 | 0.05 | 0.5 | |
| Calcium Silicate (Flow Agent) | 0.5 | 0.25 | 2.5 | |
| Pellet Binder | 0.15 | 0.05 | 2.5 | |
| Calcium Lactate | 0.03125 | 0.15 | 0.5 | Calcium Chloride |
| Dipotassium Phosphate | 0.00625 | 0.005 | 0.5 | Mono Dicalcium Phosphate |
| Monosodium Phosphate | 0.00625 | 0.005 | 0.5 | |
| Magnesium Sulfate, 9.8% | 0.13 | 0.025 | 0.75 | |
| Magnesium Gluconate | 0.01 | 0 | 0.25 | Magnesium Proteinate |
| Glycine | 0.0625 | 0.025 | 0.1 | |
| L-Lysine HCL | 0.03125 | 0.0125 | 0.2 | |
| DL-Methionine | 0.03125 | 0.0125 | 0.2 | |
| Live Yeast | 0.25 | 0.05 | 0.75 | Yeast Culture |
| *Aspergillus* Fermentation Extract | 0.05 | 0.0125 | 0.15 | |
| *Bacillis Liceniformis* Microbial | 0.01 | 0.005 | 0.1 | |
| Zinc Proteinate | 0.033375 | 0.01 | 0.1 | Zinc Sulfate, Zinc Oxide |
| Vitamin Premix | 0.316 | 0.05 | 0.5 | |
| Milk Flavor, Dry | 0.0625 | 0.0125 | 0.25 | |
| Caramel Flavor, liquid | 0.05 | 0.0125 | 0.0625 | |
| High Intensity Artificial Sweetener | 0.025 | 0.005 | 0.1 | |
| Total % | 100 | | | |

EXAMPLE 1

TRIAL I RESULTS—In a trial with 230 Heifers (first lactation females) during a period of hot-humid weather in the summer of 2003, these Heifers demonstrated a higher level of milk production when fed hydration feed supplement formula similar to that in Table I, but without a milk calcium improvement. In the four day hot weather period from July 19-22 these Heifers averaged a daily milk production of 72.65 lbs. When the feed supplement was added to their diet or ration during the 7 day period from July 23-30, the Heifers averaged 73.86 lbs. of daily milk production. When the feed supplement was removed from their diets or rations from July 31 through August $5^{th}$, the milk production of the Heifers dropped to 69.93 lbs. for the 6-day period of time.

Recap Trial I Results

| | |
|---|---|
| 4-day pre-trial milk production | 72.65 lbs. |
| 7-day trial period milk production | 73.86 lbs. |
| 6-day post trial average milk production | 69.93 lbs. |

EXAMPLE 2

In a trial using 108 mature cows, responses to the feed supplement of Example I during a period of hot weather were as follows:

Daily milk production of these 108 cows from June $10^{th}$ through June $15^{th}$ (6 days) with near normal temperatures averaged 96.1 lbs. Their average daily milk production dropped to 90 lbs. during the on-set of hot weather (90° F.+ or 32° C.+) from June 16$^{th}$ through June 18th (3 days). When the feed supplement was added to their diets-rations for 6 days from June 19$^{th}$ to June 25$^{th}$ their average daily milk production returned to 96.6 lbs.

Recap Trial 2 Results

| | |
|---|---|
| 4 day milk production prior to hot weather average daily milk production | 96.1 lbs. |
| 2 day average daily milk production with on-set of hot weather | 90 lbs. |
| 6 day average daily milk production during hot weather with the feed supplement of the invention in ration | 96.6 lbs. |

EXAMPLE 3

This was a trial on a dairy farm in which the owner monitored milk production by weighing milk production on Thursday of each week. During a 3 week period of hot weather in June 2003 the responses to the food supplement of the invention were recorded a follows:

Recap Trial 3 Results

| | |
|---|---|
| June 12 Thursday weighing for week of June 8-14 when cows DID NOT receive feed supplement | 94.5 lbs. daily production |
| June 19 Thursday weighing for week of June 15-21 when cows WERE fed the feed supplement | 97.3 lbs. daily production |
| June 21 Thursday weighing for week of June 22-28 when cows were NOT fed the feed supplement | 95.6 lbs. daily production |

EXAMPLE 4

TABLE II

| | Control Cattle | Supplement-fed Cattle |
|---|---|---|
| Number of Animals | 215 | 222 |
| Average Weight Leaving Feed Lot | 1233.04 lbs. | 1224.68 lbs. |
| Weight at Slaughter Plant | 1193.35 lbs. | 1191.35 lbs. |
| Shrink Lost in Route to Slaughter Plant | 39.69 lbs. or 3.32% of body weight | 33.33 lbs. or 2.79% of body weight |

As can be seen from the above, the supplement-fed cattle weighed 8.36 pounds less initially, but they lost 6.36 pounds less in body weight prior to slaughter.

In accordance with another important aspect of the invention, it will be recognized that it was extremely difficult for the inventors to perfect a method to manufacture a stable pellet form including the re-hydration formula of the invention that could be mixed with feed or fed as a top dress to animals in need. It will be appreciated that it is difficult to process products containing sugars, electrolytes and other water-soluble carriers into pellets without denaturing of the product which makes it unfit for animal consumption. Forcing meals or powders containing such a formula as that of the present invention through conventional pelleting machines results in congealing and caramelizing of the sugars and electrolytes and often produces solid chunks or small blocks of the material. This is clearly unacceptable.

After a long struggle with these problems, a process has been discovered which enables successful pelleting of meals and powders of the class containing a formula such as that of the present re-hydration feed supplement. In accordance with the process of the invention, meals or powders containing the formula of the invention can be combined with minor amounts of lubricants and/or coating materials and be forced through a die containing many cylindrical chambers which are also provided with heat and steam. This enables the initial formation of cylindrical pellets which form and hold the ingredients in cylindrical form. These can range in diameter from about 2 mm up to approximately 18-20 mm. A properly formed pellet will stay together in a congealed state so as be not too hard for consumption or too soft and brittle to crumble into fines. The process succeeds even though the preferred formula of the invention contains four sugars, electrolytes and other nutrients that, when exposed to heat, friction and steam, are easily denatured, caramelized and rendered useless.

A schematic representation of a pellet mill is seen generally at 10 in FIG. 1. The mill includes a vessel having a torroidal or donut-shaped die ring 12. A pair of spaced roller assemblies 14, 16 are held against the inner surface 18 of die ring 12 by a pair of resilient roller springs 20 and 22, respectively. The roller assemblies are designed to rotate about off-center or eccentric shaft assemblies, respectively represented by reference characters 24 and 26. As best seen in FIG. 3b, the resilient roller springs are identical and, for example, spring 20 includes a compression spring section 28 and a solid length or bolt section 30. This construction contrasts with the prior art solid bolt design shown in FIG. 3a at 32. A central shaft is shown at 36. The die ring 12 further contains an array of internal pellet dies spaced about the circumference of the ring 12 as at 50, which are described in greater detail with regard to FIG. 2b.

Figure 2A:
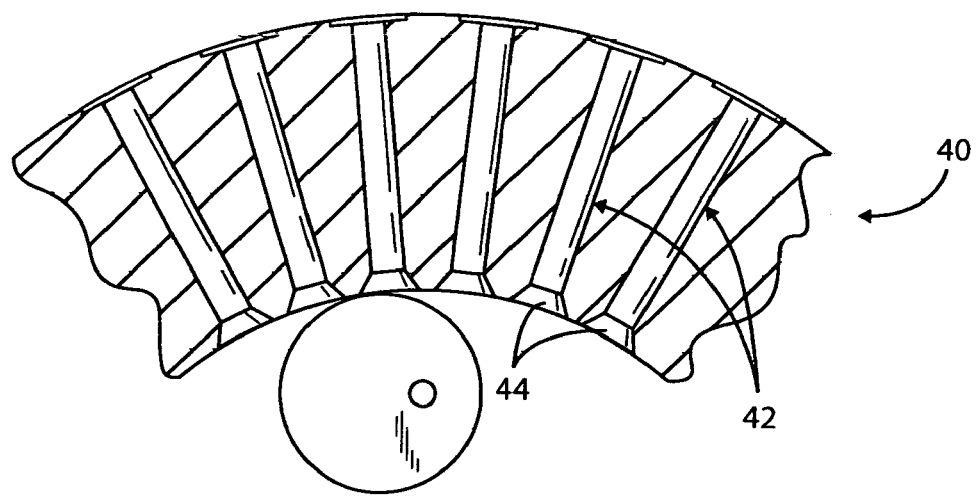
FIG. 2a is a schematic representation that depicts a prior art pellet forming die configuration.

The prior art die configuration, shown generally at 40 in FIG. 2a, includes an array of cylindrical chambers 42 having flared inlets 44 but otherwise being of a single constant diameter. Note that the single diameter cylindrical chambers 42 do not allow for the expansion of a pellet during the pelleting process. This makes the processing of the pellets extremely difficult inasmuch as the ingredients essential for re-hydration tend to expand during pelleting and therefore these high energy electrolyte and intake enhancing ingredients tend to burn, caramelize and become unusable for the purpose intended utilizing the die pictured in FIG. 2a. After a great deal of experimentation and work with the pelletizing process, it was discovered that pellet-forming cylindrical chambers having provision for expansion during the formation of the pellet could produce successful and acceptable pellet products. Such a concept has been found to enable the production of a high quality acceptable pellet that is not too soft or crumbly, and is not too hard or overheated during processing.

Figure 2B:
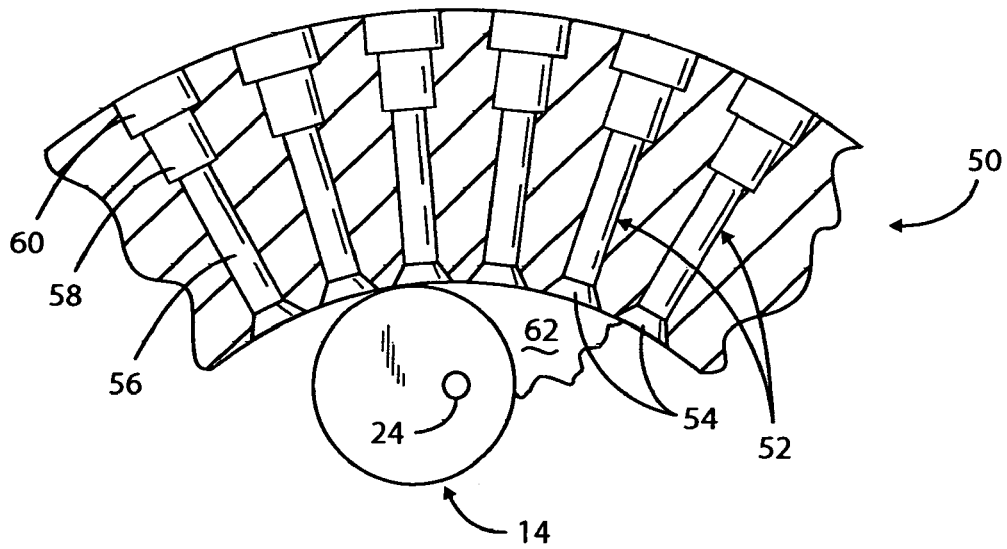
FIG. 2b is a schematic representation similar to FIG. 2a showing one die configuration in accordance with the invention.

FIG. 2b depicts a schematic representation similar to that shown in FIG. 2a of one die configuration in accordance with the invention. The die configuration shown generally at 50 includes a plurality of cylindrical chambers 52 having flared inlets as at 54 and including sections or segments of different diameters, including a first or initial segment 56, second segment 58 of a larger diameter and a third section 60 of a still larger diameter. Pressurized feed material to be urged into the die 50 is shown at 62. Note that the three chamber segments 56, 58 and 60, which make up the pellet-forming cylindrical die chambers 52 of increasing diameter, allow the pellets to expand in size while passing through the die chamber segments. A multi-step increasing die diameter sizing along the cylindrical chambers allows a pellet to expand as it forms and passes through the canal thereby compensating for increased friction and overheating due to increased pressure prevalent in earlier die configurations. Thus, it has been found that die chambers having a plurality of segments of increasing diameter in the direction of pellet formation greatly reduce and even eliminate burning, caramelization and other unacceptable results in the pelleting process for the rehydration supplement of the invention.

The production of uniform pellets further requires that the materials processed in the various cylindrical chambers throughout the die need to undergo similar heating to produce uniform results. For this to occur, compensation is required. For example, if the array of cylindrical chambers in a die are configured in rows of ten and receive heat from steam outside of the die, the heat is transmitted toward the middle or center from the outside; and, as the steam penetrates the die approaching the center, it drops in temperature and looses transferable heat.

This phenomenon may be compensated in the design of the die. For example, as shown in the illustration of FIG. 2, the relative lengths of the segments of the three-segment chambers may be varied in order to produce more uniform heating of the product. In this regard, a typical row of ten cylindrical chambers having a nominal length of 2.25 inches (57.2 mm) might be configured as follows:

The four outside chambers with greatest heat exposure are constructed with length/diameter sizes as follows:
first inch (25.4 mm) of chamber length has an $11/64$ inch (4.37 mm) diameter
second ¾ inch (19.1 mm) of chamber length has a $12/64$ inch (4.76 mm) diameter
third ½ inch (12.7 mm) of chamber length has a $13/64$ inch (5.16 mm) diameter The four intermediate placed chamber lengths/diameters with intermediate heat exposure have the following chamber lengths/diameters:
first 1 and ¼ inch (31.75 mm) of chamber length has an $11/64$ inch (4.37 mm) diameter
second ½ inch (12.7 mm) of chamber length has a $12/64$ inch (4.76 mm) diameter
third ½ inch (12.7 mm) of chamber length has a $13/64$ inch (5.16 mm) diameter The two interior or center placed chambers with the least heat exposure transmitted from the outside have the following lengths/diameters:
first 1 and ½ inch of chamber length has an $11/64$ inch (4.37 mm) diameter
second ½ inch (12.7 mm) of chamber length has a $12/64$ inch (4.76 mm) diameter
third ¼ inch (6.35 mm) of chamber length has a $13/64$ inch (5.16 mm) diameter The above construction enables additional heat buildup in interior chambers. The die is preferably fabricated from an alloy softer than steel or metals used in conventional dies. As indicated, in accordance with an aspect of the process of the present invention, the canals or die chambers in the die are made to expand in size from the inlet to the outlet to accommodate the expansion of the material as it encounters heat and steam. This expansion is varied based on the position of a given chamber in the die to make heat buildup more uniform throughout the die. In the preferred embodiments, the expansion of the canals or die chambers is preferably in the form of a rather abrupt increase in diameter.

In addition, whereas most pelleting machines are equipped with a feed roller that forces all meals or powders through the pellet die, it has been found that in accordance with the formula of the present invention, a flexible, open-ended roller provides adequate force and exerts less pressure and compaction on the meal thereby also reducing problems associated with denaturing of the ingredients by over-pressurizing during the pelleting process.

Figure 4A:
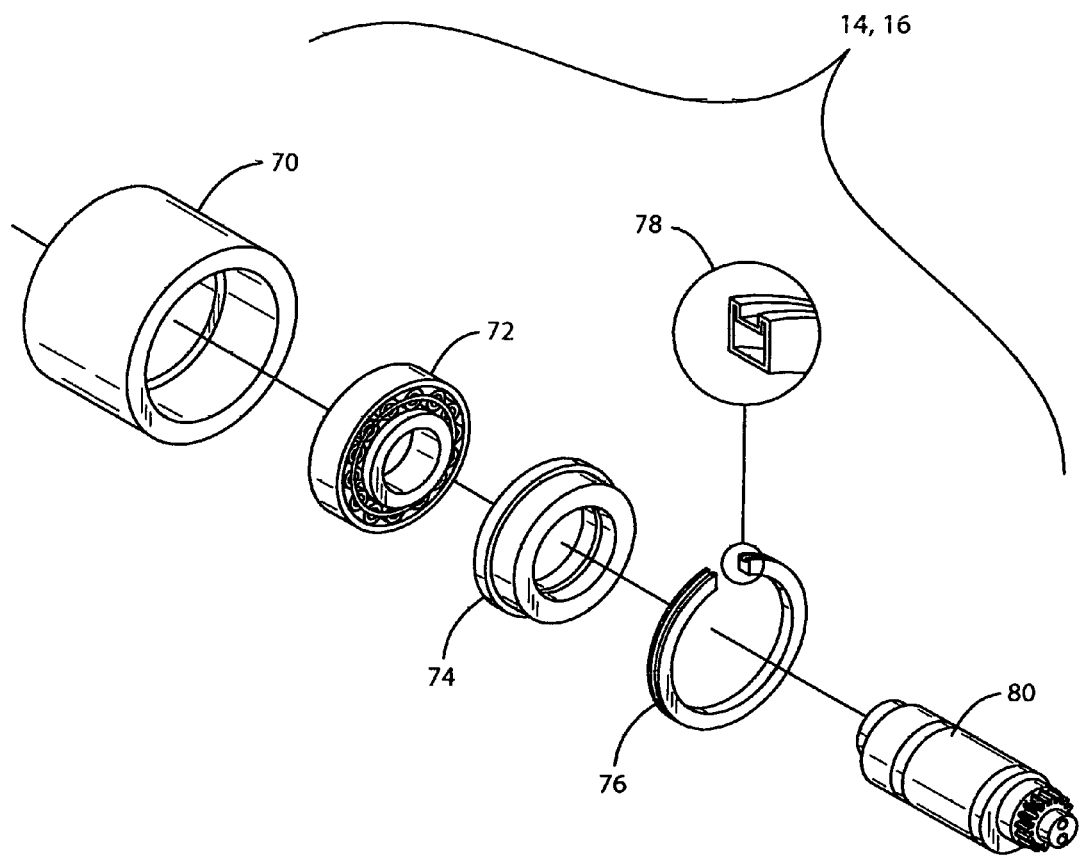
FIG. 4a depicts a partial exploded view of a patterned roller assembly in accordance with the invention.
Figure 4B:
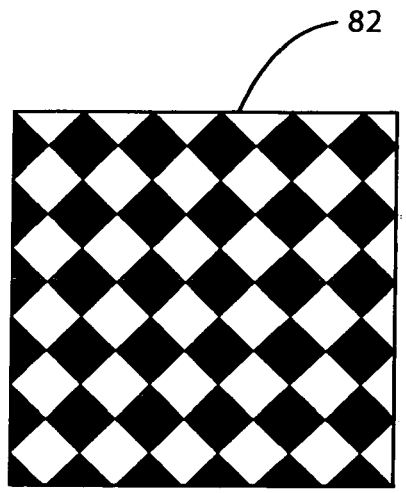
Figure 4B:
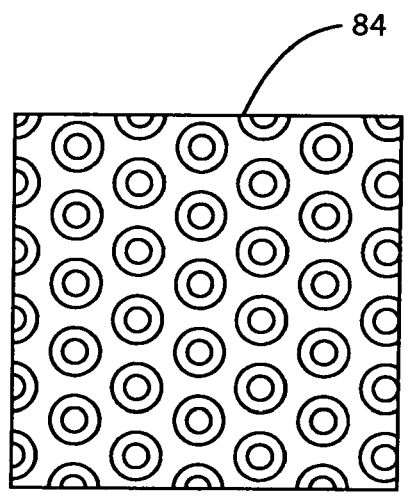
Figure 4B:
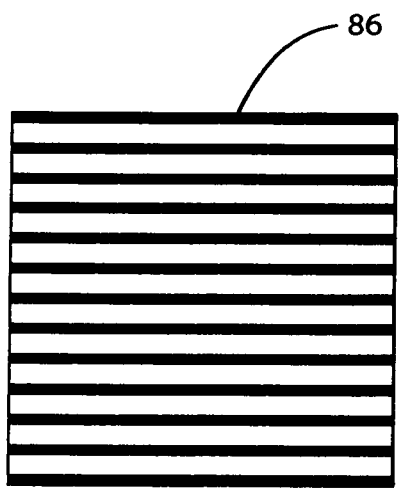
Figure 4B:
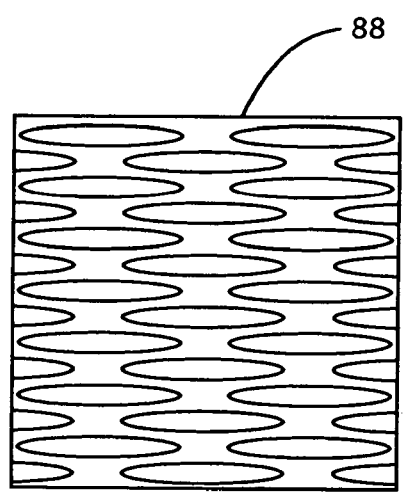

A partial exploded view showing parts of an open-ended roller assembly in accordance with the invention is shown in FIG. 4a including an open-ended roller 70, an internal bearing assembly 72, roller shaft collar 74, a roller oil seal 76 with enlarged detail 78 and roller shaft 80. A variety of surface configurations for the roller 70 are shown in FIG. 4b and include a diamond pattern 82, a dimpled pattern 84, a hard cote pattern 86 and a coin slot pattern 88. While any of these patterns can be used, the preferred embodiment of the roller utilizes a soft diamond pattern which assist in cupping ingredients gradually into the die canals of the pellet mill ring 12.

The diamond pattern is preferred as it exerts minimal pressure and less force hardening action as compared to flat surfaces or bars that forcefully compress ingredients into the canal funnels. Thus, a cupping diamond pattern has been observed to reduce friction and compaction of the ingredients urged into the dies.

In addition it has been found that a coating agent added to the formula aids in preventing denaturing of the sensitive ingredients during the process. A coating agent is also preferably added to the pellets as they exit the die chambers or canals as this further prevents the pellets from sticking to each other which results in the formation of undesirable cubes or clumps. Such coating agents which have found use in processing the formula of the present invention include powdered calcium carbonate and calcium silicate, the latter being the preferred material.

In conjunction with friction control aspects of the process, it is also desirable to add a lubricating fluid to the formula to enhance passage through the die and further reduce damage from friction and heat. It has also been found that cooked cereal products such as pre-cooked breakfast cereal food products, particularly cereal fines, act as successful carriers for pelleting the formula. Cooked cereals also have been found to enhance pellet consumption by the animals of interest as compared to uncooked cereal products or other grain by-products.

In operation, the pellet mill as depicted in FIG. 1 receives mixed pellet stock between the rollers 14 and 16 which slowly rotate around the inside of the pellet ring 12 held against surface 18 by the resilient roller springs 20 and 22. The resilient roller springs control the amount of pressure exerted against the feed by the rollers 14 and 16 as they also rotate about their eccentric off-center shaft assemblies 24 and 26. The off-center shaft assemblies 24 and 26 also make it easier to capture pellet stock between the rollers 14 and 16 and the die ring 12. The open diamond or other surface pattern on the open-ended roller assemblies 14 and 16 also enable meal to escape between the raised portions of the pattern surface. These features combine to reduce the friction and heat buildup on the product as it is being extruded through the pelleting dies 52. Thus, the pellet mill continues to receive mixed pellet feed stock and continues to extrude material through a large number of dies which can then be cut into pellets of any desired length.

This invention has been described herein in considerable detail in order to comply with the patent statutes and to provide those skilled in the art with the information needed to apply the novel principles and to construct and use such specialized components as are required. However, it is to be understood that the invention can be carried out by specifically different equipment and devices, and that various modifications, both as to the equipment and operating procedures, can be accomplished without departing from the scope of the invention itself.

What is claimed is:

1. A method of producing pellets of an animal feed supplement formula comprising:
   (a) providing a pellet mill including,
      (1) a pellet ring die containing an array of hollow, generally cylindrical die chambers extending through the pellet ring, each chamber having an inlet and an outlet wherein the diameter of said die chambers increases between said inlet and said outlet;
      (2) a pair of spaced opposed rollers adapted to be operated by a central shaft to rotate about the inside of said pellet ring, said rollers being connected by a length-variable spring-biased arrangement including roller springs connected to enable individual or simultaneous resilient reaction to limit and control the amount of pressure exerted by the rollers against pellet stock to aid in the prevention of overheating of the pellet stock during pellet formation;
      (3) a source of heat and steam to be applied to the chambers;
   (b) providing amounts of pellet stock comprising premixed dry powder including a selected feed supplement formula;
   (c) using said rollers to apply a limited and controlled pressure to force amounts of said pellet stock into the die chambers and causing it to pass through the chambers forming congealed cylindrical pellets in the presence of heat and steam; and
   (d) enabling developing pellets to expand as they progress in said chambers to aid in the prevention of overheating of the pellet stock during pellet formation.

2. A method as in claim 1 wherein the diameter of said die chambers in said die abruptly increases in size at one or more places between the inlet and outlet thereby providing a plurality of chamber segments having different diameters.

3. A method as in claim 2 wherein said die chambers include segments having three different diameters.

4. A method as in claim 3 wherein said plurality of chamber segments have varying lengths depending on location of a corresponding chamber in the die.

5. A method as in claim 1 further comprising applying a coating agent, both to the formula and pellets produced to prevent denaturing of ingredients during pelleting.

6. A method as in claim 5 wherein said coating agent is selected from the group consisting of powdered calcium carbonate and calcium silicate.

7. A method as in claim 6 wherein said coating agent is calcium silicate.

8. A method as in claim 1 further comprising applying a coating agent as pellets exit said die chambers to prevent the pellets from sticking to each other and prevent the formation of cubes or clumps.

9. A method as in claim 8 wherein said coating agent is selected from the group consisting of powdered calcium carbonate and calcium silicate.

10. A method as in claim 1 further comprising applying a lubricating flow agent to the formula to enhance passage through the die and further reduce the effects of friction heat.

11. A method as in claim 10 further comprising adding a carrier material to the pellet stock formula in the form of previously cooked cereal fines.

12. A method as in claim 11 further comprising applying a coating agent as the pellets exist said die chambers to prevent the pellets from sticking to each other and prevent the formulation of cubes or clumps.

13. A method as in claim 11 further comprising applying a coating agent, both to the formula and the pellet to prevent denaturing of ingredients during pelleting.

14. A method as in claim 13 wherein said coating agent is selected from the group consisting of powdered calcium carbonate and calcium silicate.

15. A method as in claim 14 wherein the lubricating flow agent is selected from the group consisting of cane molasses, beet molasses, animal and vegetable fats, mineral oil, animal and vegetable fat blends and soap stock.

16. A method as in claim 10 wherein the lubricating flow agent is selected from the group consisting of cane molasses, beet molasses, animal and vegetable fats, mineral oil, animal and vegetable fat blends and soap stock.

17. A method as in claim 16 wherein the lubricating flow agent is selected from animal and vegetable fats.

18. A method as in claim 1 further comprising adding a carrier material to the pellet stock formula in the form of previously cooked cereal fines.

19. A method as in claim 1 wherein said spring-biased opposed rollers are open ended.

20. A method as in claim 1 including facilitating capture of pellet stock by providing said opposed said spring-biased opposed rollers with eccentric off-center shafts.

21. A method as in claim 20 including providing said spaced opposed rollers with a surface pattern including raised portions thereby enabling amounts of said pellet stock to escape between said raised portions.

22. A method as in claim 21 wherein said surface pattern is selected from the group consisting of a diamond pattern, a dimpled pattern, a hard cote pattern and a coin slot pattern.

23. A method as in claim 22 wherein said surface pattern is a diamond pattern.

24. A method as in claim 1 including providing said spaced opposed rollers with a surface pattern including raised portions thereby enabling amounts of said pellet stock to escape between said raised portions.

25. A method as in claim 24 wherein said surface pattern is selected from the group consisting of a diamond pattern, a dimpled pattern, a hard cote pattern and a coin slot pattern.

26. A method as in claim 25 wherein said surface pattern is a diamond pattern.

27. A method as in claim 1 wherein the pellet stock includes an amount of saccharides in a formula from about 3.5% to about 60% and wherein the temperature of the pellet stock is maintained below a temperature that causes denaturing or caramelizing of formula components.

28. A method as in claim 27 wherein said saccharides include monosaccharides dextrose and fructose and disaccharides including sucrose and lactose.

29. A method as in claim 28 wherein the amount of saccharides is about 14%.

30. A method as in claim 1 wherein said spring-biased roller arrangement includes a spring connected between each of said rollers and said central shaft.

* * * * *